US012576928B1

(12) United States Patent
Smith

(10) Patent No.: US 12,576,928 B1
(45) Date of Patent: Mar. 17, 2026

(54) LOCKING SYSTEM FOR KING PIN OF FIFTH WHEEL

(71) Applicant: James C Smith, Carthage, MS (US)

(72) Inventor: James C Smith, Carthage, MS (US)

(73) Assignee: George L Williamson, Fairhope, AL (US)

( * ) Notice: Subject to any disclaimer, the term of this patent is extended or adjusted under 35 U.S.C. 154(b) by 0 days.

(21) Appl. No.: 18/929,878

(22) Filed: Oct. 29, 2024

(51) Int. Cl.
*B62D 53/10* (2006.01)
*B62D 53/08* (2006.01)
*B62D 53/12* (2006.01)

(52) U.S. Cl.
CPC ......... *B62D 53/10* (2013.01); *B62D 53/0842* (2013.01); *B62D 53/12* (2013.01)

(58) Field of Classification Search
CPC ..... B62D 53/10; B62D 53/0842; B62D 53/12
See application file for complete search history.

(56) References Cited

U.S. PATENT DOCUMENTS

| | | | | |
|---|---|---|---|---|
| 2,925,286 | A | * 2/1960 | Hodges, Jr. | ........ B62D 53/0828 |
| | | | | 280/901 |
| 3,759,545 | A | * 9/1973 | McKethan | ......... B62D 53/0828 |
| | | | | 280/901 |
| 3,823,960 | A | * 7/1974 | Boggs | .................... B62D 53/10 |
| | | | | 280/432 |
| 4,067,213 | A | 1/1978 | Little | |

| | | | | |
|---|---|---|---|---|
| 4,455,036 | A | * 6/1984 | Barr | ....................... B62D 53/10 |
| | | | | 280/434 |
| 5,120,080 | A | * 6/1992 | Ritter | ..................... B62D 53/12 |
| | | | | 280/433 |
| 5,516,137 | A | * 5/1996 | Kass | ....................... B62D 53/12 |
| | | | | 280/434 |
| 5,988,666 | A | * 11/1999 | Flater | ..................... B62D 53/08 |
| | | | | 280/434 |
| 6,100,794 | A | * 8/2000 | Hillier | .................... B62D 53/12 |
| | | | | 340/687 |
| 6,170,851 | B1 | * 1/2001 | Lindenman | ........ B62D 53/0835 |
| | | | | 280/438.1 |
| 6,520,527 | B2 | * 2/2003 | Laarman | ................ B62D 53/06 |
| | | | | 280/433 |
| 6,695,337 | B1 | 2/2004 | Breese et al. | |
| 7,735,849 | B1 | * 6/2010 | Mann | ..................... B62D 53/10 |
| | | | | 280/436 |
| 7,770,910 | B1 | * 8/2010 | Shirk, Jr. | ............... B62D 53/10 |
| | | | | 280/433 |

(Continued)

*Primary Examiner* — Valentin Neacsu
*Assistant Examiner* — Michael R Stabley
(74) *Attorney, Agent, or Firm* — George L Williamson

(57) ABSTRACT

Method and apparatus for locking the king pin of a trailer within a conventional fifth wheel as is commonly used on highway truck-tractors. The locking system is designed to operate independently of and without interference with any release mechanism that is used on conventional fifth wheels in use at this time. The device includes a sliding rod member which slides transversely across the throat of the opening into the slot of the lock jaw where the king pin is normally secured to the fifth wheel. The sliding rod member slides reciprocatedly through mating oppositely disposed holes in the walls of the sides of the opening into the slot of the fifth wheel so that when the rod member is positioned across the throat, the king pin is prevented from becoming dislodged from the fifth wheel.

15 Claims, 6 Drawing Sheets

(56)  References Cited

U.S. PATENT DOCUMENTS

| 8,210,558 | B2 * | 7/2012 | Mann ..................... B62D 53/10 |
| | | | 280/436 |
| 9,738,333 | B2 | 8/2017 | Alldredge et al. |
| 2006/0255921 | A1 | 11/2006 | Ungerman |
| 2014/0138933 | A1 | 5/2014 | Diller |
| 2015/0158355 | A1 | 6/2015 | Alldredge et al. |

* cited by examiner

LOCKING SYSTEM FOR KING PIN OF FIFTH WHEEL

PRIOR ART

Devices relevant to the present invention have been described in the related art; however, none of the related art devices disclose the unique features of the present invention. In U.S. Pat. No. 6,695,337, dated Feb. 24, 2004, Breese, et al., disclosed a pivotal pin rock for fifth wheel hitch. In U.S. Pat. No. 9,738,333, dated Aug. 22, 2017, Alldredge, et al., disclosed a fifth wheel locking mechanism. In U.S. Patent Application Publication No. 2015/0158355, dated Jun. 11, 2015, Alldredge, et. al., disclosed a fifth wheel locking mechanism. In U.S. Pat. No. 4,067,213, dated Jan. 10, 1978, Little disclosed a truck trailer fifth wheel pin lock. In U.S. Patent Application Publication No. 2006/0255921, dated Nov. 16, 2006, Ungerman disclosed a trailer safety system. In U.S. Patent Application Publication No. 2014/0138933, dated May 22, 2014, Diller disclosed a jawed fifth wheel hitch.

While these devices may be suitable for the purposes for which they were designed, they would not be as suitable for the purposes of the present invention as hereinafter described. As will be shown by way of explanation and drawings, the present invention works in a novel manner and differently from the related art.

BACKGROUND OF THE INVENTION

The present invention relates generally to fifth wheels for use on highway truck tractors and, more particularly, is concerned with a locking mechanism for securing a king pin within the fifth wheel.

SUMMARY OF THE INVENTION

The present invention discloses a system for locking the king pin of a trailer within a conventional fifth wheel as is commonly used on highway truck-tractors. The locking system of the present invention is designed to operate independently of and without interference with any release mechanism that is used on conventional fifth wheels in use at this time. The present invention includes a sliding rod member which slides transversely across the throat of the opening into the slot of the lockjaw where the king pin is normally secured to the fifth wheel. The sliding rod member reciprocatedly slides through mating oppositely disposed holes in the walls of the sides of the opening into the slot of the fifth wheel so that when the rod member is positioned across the throat, the king pin is prevented from becoming dislodged from the fifth wheel due to, for example, vandalism.

An object of the present invention is to provide a system of locking the king pin on the trailer within the slot of a fifth wheel which can be used in association with and which is compatible with all conventional and pre-existing mechanisms for locking and unlocking a fifth wheel. A further object of the present invention is to provide a system for locking the king pin in the fifth wheel to prevent unintentional separation of the king pin from the fifth wheel due to any number of reasons, for example, including accidental separation or separation due to vandalism. A further object of the present invention is to provide a fifth wheel locking system which incorporates a sliding rod member transversely positioned across the slot of the fifth wheel. A further object of the present invention is to provide a locking system for a fifth wheel which can be easily operated by a user. A further object of the present invention is to provide a locking system which can be relatively easily and inexpensively manufactured.

The foregoing and other objects and advantages will appear from the description to follow. In the description reference is made to the accompanying drawings, which form a part hereof, and which are shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF DRAWINGS

In order that the invention may be more fully understood, it will now be described, by way of example, with reference to the accompanying drawings in which.

DETAILED DESCRIPTION OF THE INVENTION

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein a system for locking the king pin of a fifth wheel is disclosed and which is generally indicated by reference number 11.

Figure 1:
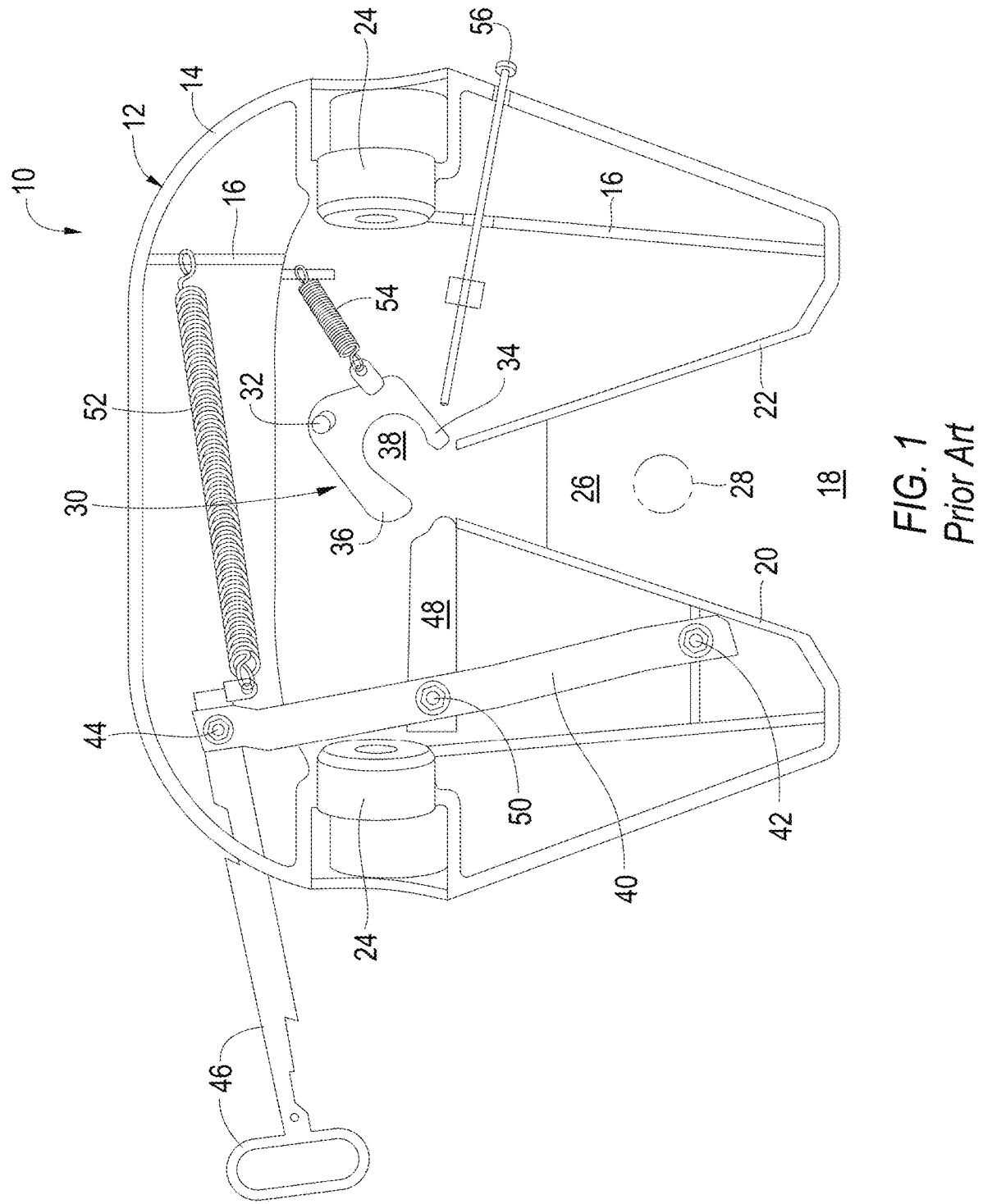
FIG. 1 is a bottom view of a prior art fifth wheel in the unlocked position.
Figure 2:
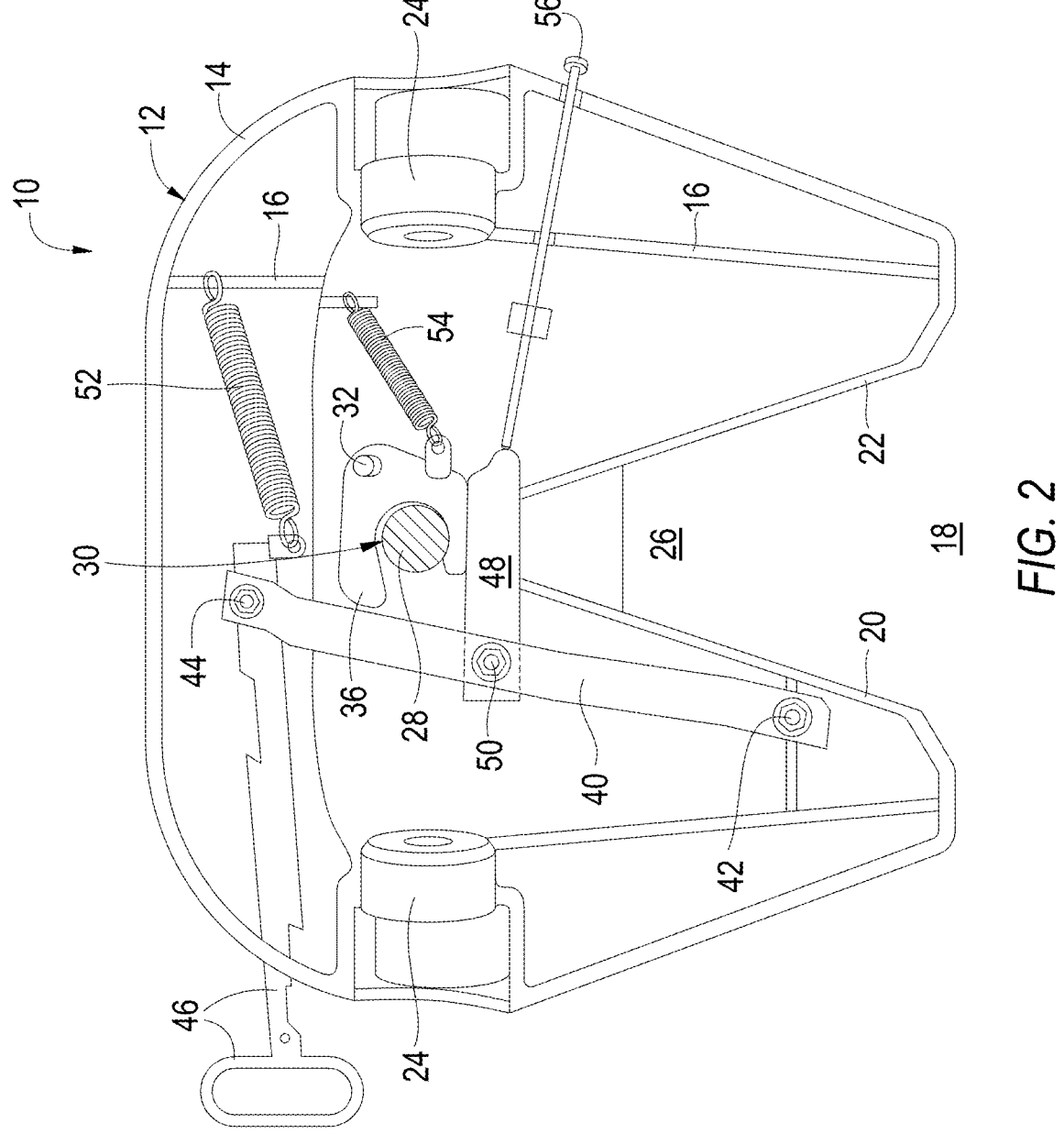
FIG. 2 is a bottom view of a prior art fifth wheel in the locked position.

Turning to FIGS. 1 and 2, therein are shown bottom views of a prior art version of a conventional fifth wheel wherein FIG. 1 shows a fifth wheel being generally indicated by reference number 10 in an unlocked position and FIG. 2 shows a fifth wheel in a locked position wherein the fifth wheel is for being mounted in a conventional manner on the rear platform of a highway tractor (not shown). The fifth wheel 10 includes a top plate or wheel plate 12 having a conventional configuration being horseshoe shaped with a peripheral downwardly depending flange 14 and strengthening web 16 with a rear opening 18 formed by opposing divergent leg portions 20, 22 and terminating in an elongated medial slot 26 for receiving a vehicle or trailer king pin 28 which would be mounted in a conventional manner on the front underside of a trailer (not shown). The wheel plate 12 is pivotally connected at opposite sides thereof to brackets (not shown) by means of housing bosses 24 for receiving pivot pins for pivotable engagement with the brackets which are adapted to be secured to the frame of a highway tractor by means of bolts or screws. The wheel plate 12 is formed with an inwardly converging slot 26 on its rear end adapted to receive a king pin 28 secured to a trailer (not shown).

A coupling jaw or lock jaw 30 is pivotally mounted on the underside of the wheel plate 12 by means of a pivot pin 32. The coupling jaw 30 having a C-shape is formed with a locking arm 34 spaced from a tail 36 to define a recess 38 to snugly receive the neck portion of the kingpin 28 when the tractor is backed up to the trailer and the king pin 28 moves into recess 38 so that the lockjaw 30 is moved into the locked position, i.e, the king pin retaining position. A release arm 40 has one end thereof pivotally mounted at 42 to the underside of the wheel plate 12. The release arm 40 has its free end pivotally connected at 44 to the inner end of a release handle 46 slidably mounted in an opening formed in the wheel plate 12. A lock bar 48 is mounted for reciprocative movement in response to movement of the release handle 46 along the underside of the wheel plate 12 wherein one end is pivotally joined at 50 intermediate the release arm 40 so that the body of the lock bar 48 slides across the opening of the recess 38 behind the locking arm 34 to secure the locking arm 34 in its locked position so as to secure the king pin 28 in the fifth wheel and ready it for transit. A first compression spring 52 is provided to yieldably resist movement of the release handle 46 from its locked position toward its retracted unlocked position. A second spring 54 is provided to bias lock jaw 30 toward the open unlocked position. An elongated adjusting screw 56 is provided to allow the lock bar 48 to maintain a snug coupling even as the lock jaw 30 and related components wear due to use. In operation, the lock bar 48 is designed to prevent pivotal movement of the coupling arm 34 when the king pin 28 is engaged in the recess 38 of the wheel plate 12.

When a trailer is to be uncoupled from a tractor, the operator moves the release handle 46 outwardly to cause the lock bar 48 to slide away from the locking arm 34 to permit the coupling jaw 30 to pivot to its open unlocked position so that the kingpin 28 can be removed from recess 38.

Figure 3:
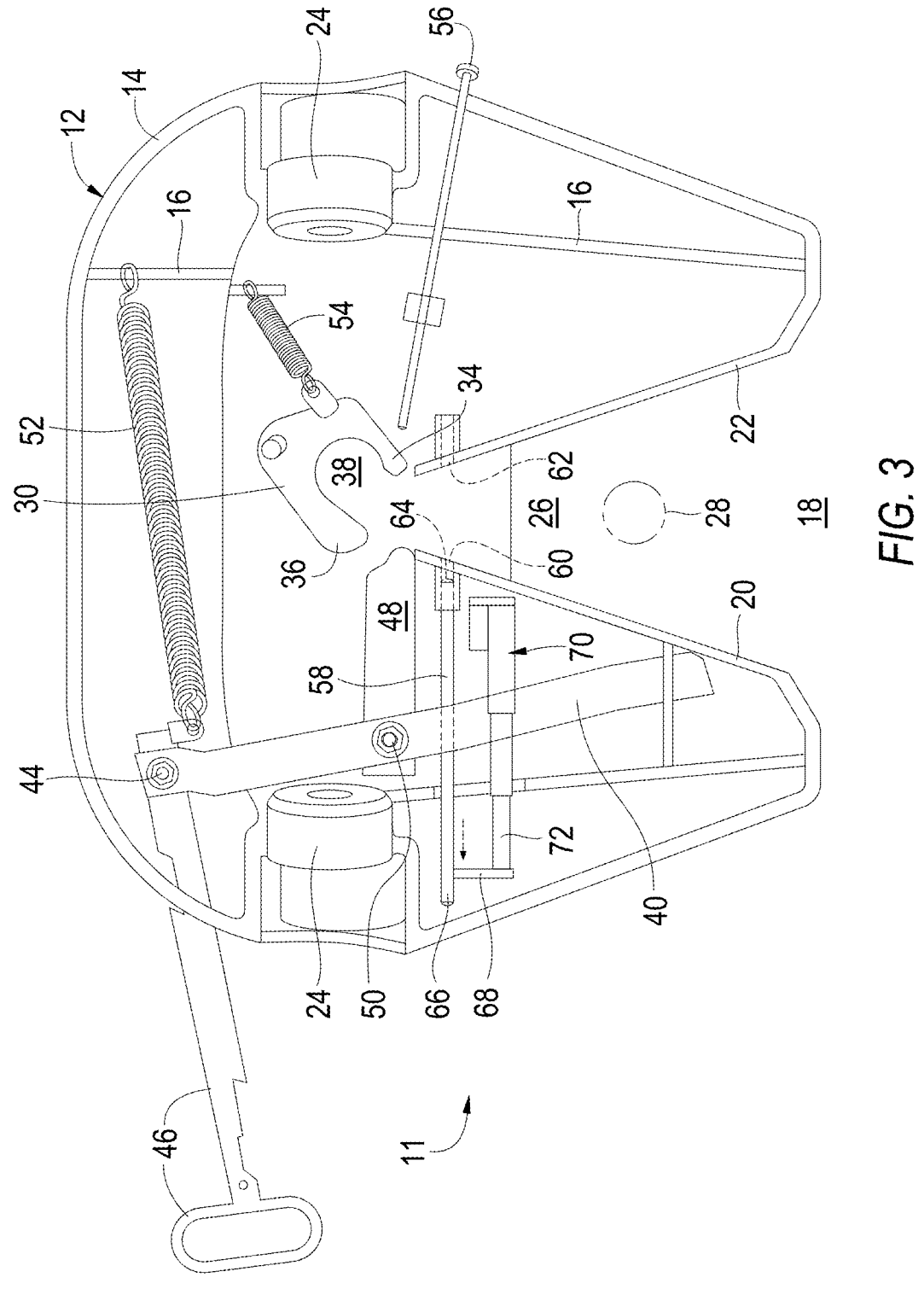
FIG. 3 is a bottom view of the present invention shown in the unlocked position with a linear actuator.
Figure 4:
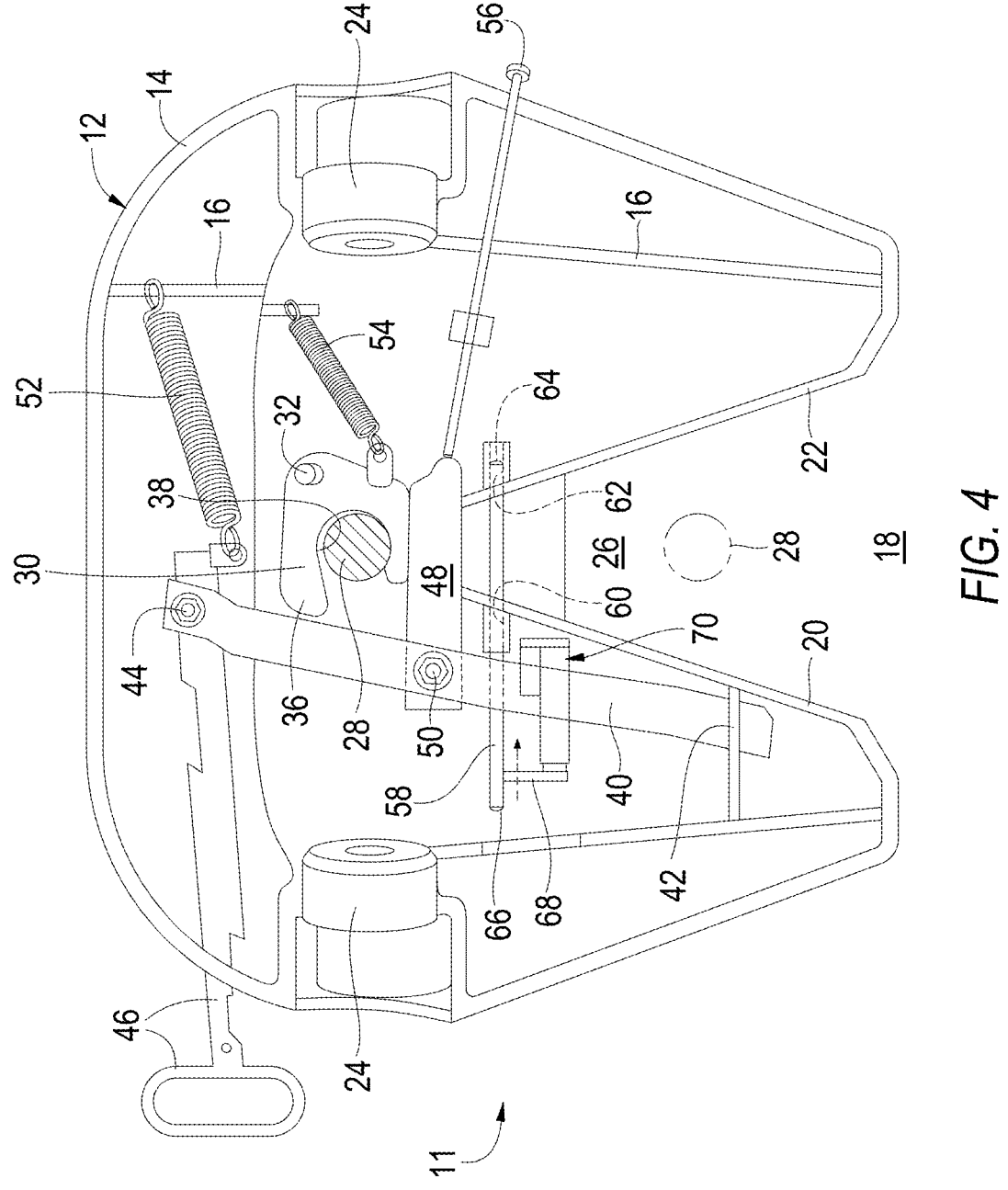
FIG. 4 is a bottom view of the present invention shown in the locked position with a linear actuator

Turning to FIGS. 3 and 4, therein are shown bottom views of the top plate 12 including the present invention 11 including an elongated rod member 58 which is reciprocatedly and slidably positioned so that it will slide in the horizontal plane transversely completely across the slot 26 leading into the recess 38 behind the lock bar 48 and behind where the king pin 28 is to be disposed when it is in the locked and secured position thereby blocking the king pin 28 from exiting the slot 26 of the fifth wheel. Rod member 58 could be either round or square in shape and would be made of very strong material such as steel. FIG. 3 shows the rod member 58 and the linear actuator 70 in an unlocked position and FIG. 4 shows the rod member 58 in a locked position along with the linear actuator 70. The rod member 58 slides completely through a first through-hole 60 disposed in divergent leg 20 and a mating oppositely disposed second through-hole 62 disposed in divergent leg 22 and wherein the rod member 58 has a first end 64 along with a second end 66 wherein a connecting member 68 positioned proximate second end 66 connects the rod member 58 to a shaft 72 on linear actuator 70 so that rod member 58 moves in response to movement of shaft 72. It can be seen that FIG. 3 shows the locked jaw 30 of the fifth wheel in the unlocked position. It can also be seen that all components of the present invention 11 are positioned relative to the conventional components of the fifth wheel in such a manner as not to interfere with, i.e., to be interference-free relative to, the operation of the release handle mechanism 46 as used with the conventional fifth wheel. Means for reciprocating the elongated rod member 58 are provided in the form of the linear actuator 70 and also a pneumatic air cylinder 96 as shown in FIGS. 5 and 6.

Figures 5, 6, 9:
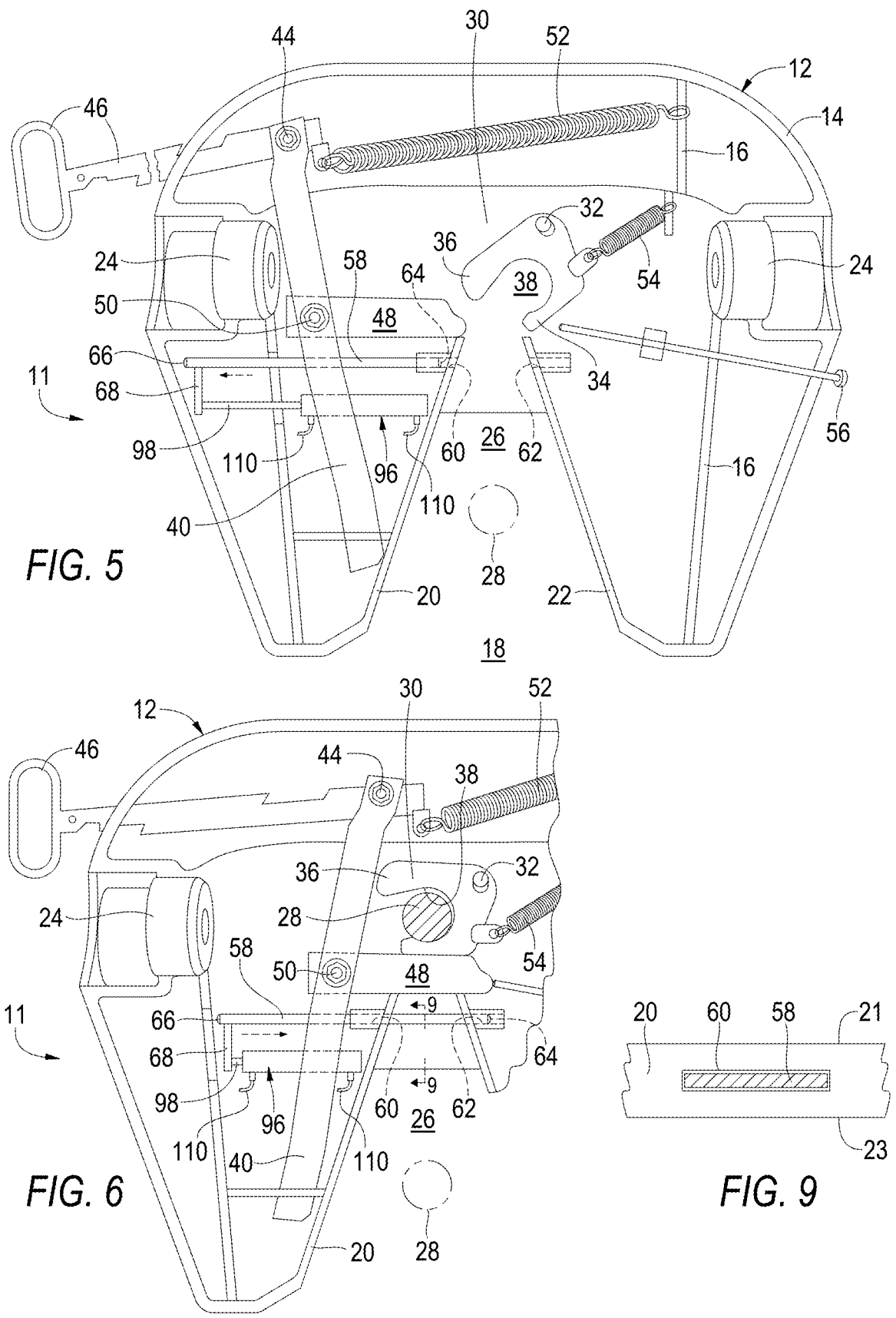
FIG. 5 is a bottom view of the present invention shown in the unlocked position with a pneumatic cylinder.
FIG. 6 is a bottom view of a cut-away view the present invention shown in the locked position with a pneumatic cylinder.
FIG. 9 is a side elevation view of portions of the present invention taken along line 9-9 as indicated on FIG. 6.

Turning to FIGS. 5 and 6, therein is shown the present invention 11 wherein FIG. 5 shows the rod member 58 and the pneumatic cylinder 96 in an unlocked position and FIG. 6 shows the rod member 58 in a locked position along with the linear actuator 96. Also shown are shaft 98 of the pneumatic cylinder 96 along with air line 110. FIGS. 5 and 6 are similar to FIGS. 3 and 4 except that a pneumatic cylinder 96 is substituted for linear actuator 70. Other previously disclosed elements are also shown.

Figure 7:
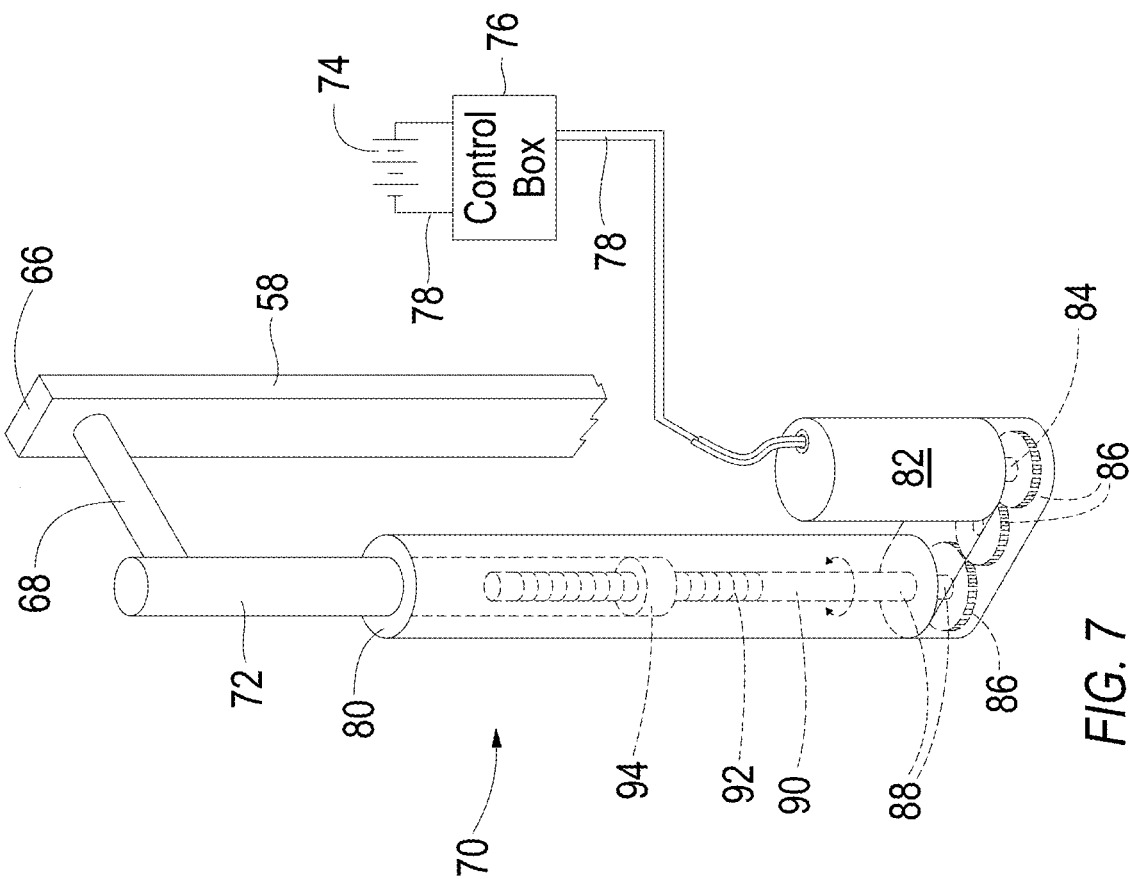
FIG. 7 is a perspective view of an exemplary linear actuator for use with the present invention.

Turning to FIG. 7, therein are shown details of an exemplary linear actuator 70 which operates on any appropriate conventional electrical system which could be either AC or DC and could be supplied by any suitable source such as an electrical power supply 74, e.g., a battery of a vehicle. Electrical power from the electrical power supply 74 is supplied to a control box 76, i.e., an electrical controller, through electrical wiring harness 78. The present invention 11 includes an enclosure 80. Shaft 72 is extended and retracted into the housing 80 by means of a linear actuator generally indicated by reference number 70 including a drive motor 82 having a rotating output drive shaft 84 with a set of gears forming a gear assembly 86 in a gear box or enclosure wherein one of the gears has another rotating output drive shaft 88 wherein the drive shaft 88 is mechanically coupled to a threaded ball screw/spindle 90 having a set of threads 92 thereon which threads 92 are interconnected to mating threads on a ball nut 94 so that as the threaded ball screw/spindle 90 is rotated by the drive motor 82, the ball nut 94 moves linearly along the screw/spindle 90. Ball nut 94 is interlocked to the cover or enclosure 80 to prevent its rotation so that the shaft 72 moves linearly along the enclosure 80 as the threaded ball screw/spindle 90 rotates and thereby extends and retracts the shaft 72 end into and out of the enclosure 80 in response to the rotation of motor 82 in either a clockwise or a counterclockwise direction.

Continuing with FIG. 7, an electrical controller 76 could be an electromechanical or electrical circuit or system that can control some function by transmitting signals through a conductor (hard wire) or the air (wireless). Control may be carried out by audio, radio, a cue stick, or infrared transmission and could be accomplished by using the operator interface from the cab of the highway tractor. Examples of controllers include infrared TV/stereo/VCR remotes, and radio controllers for opening doors or controlling model airplanes, cars, boats, or motors 82 or other suitable user interface and may be handheld. It may be synonymous with a microcontroller which is a monolithic integrated circuit with a complete central processing unit (CPU) and enough semi conductor memory (our a.m., ROM, E PROM, are EE PROM) and input-output (I/O) capability to be considered as equivalent to a "computer on a chip." Because of its limited memory, a microcontroller is usually used in control rather than data processing applications. A motor controller could be a device or group of devices that can coordinate in a predetermined manner the performance of an electrical motor such as motor 82. A motor controller might include a manual or automatic means for starting and stopping the motor 82, selecting forward or reverse rotation, selecting and regulating the speed, regulating or limiting the torque, and protecting against overloads and electrical faults. Motor controllers may use electromechanical switching, or may use power electronics devices to regulate the speed and direction of a motor 82.

Figure 8:
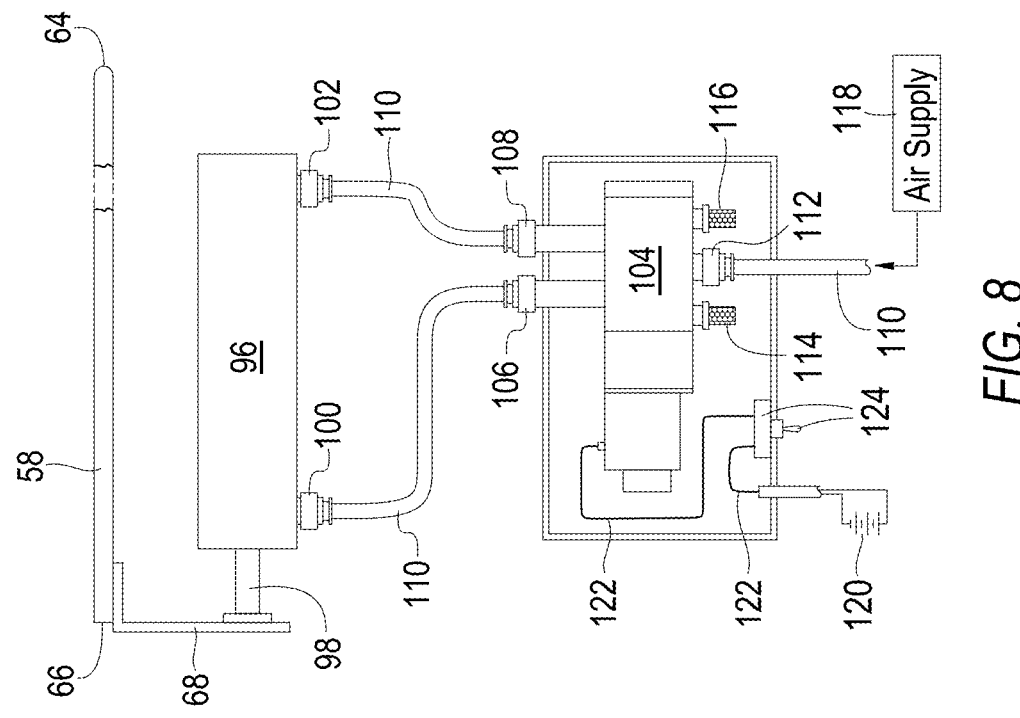
FIG. 8 is an elevation view of an exemplary pneumatic cylinder for use with the present invention.

Turning to FIG. 8, therein is shown a detailed view of an exemplary pneumatic air cylinder 96 and related appurtenances which could be used with the present invention 11. Therein is shown a pneumatic air cylinder 96 having a slidable shaft therein 98 which has an internal slidable piston mounted on the shaft (not shown) which moves back and forth longitudinally along the air cylinder in response to air supplied to either a first or second side as would be done in the standard manner by one skilled in the art. The pneumatic air cylinder 96 has a first air inlet/outlet port 100 along with a second air inlet/outlet port 102 which has an air line 110 connected thereto which transmits air back and forth to the pneumatic solenoid valve 104. The pneumatic solenoid valve 104 is a 5-way, 2-position pneumatic solenoid valve which is commonly commercially available.

One exemplary pneumatic solenoid valve model that could be used with the present invention 11 is a Tailonz Pneumatic ⅜" NPT 12 Volt Solenoid Valve Model 4V310-10. There are other appropriate pneumatic solenoid valves which could be used with the present invention 11.

The pneumatic solenoid valve 104 includes a first vent port 106 and a second vent port 108. Also included is an air intake port 112 along with an air supply 118 which supplies air through an air line 110 to be used by the pneumatic solenoid by 104. Also shown is a first exhaust port 114 along with a second exhaust port 116 along with the air supply 118. Also shown is a an electrical power supply 120, e.g., the tractor electrical power system, which would normally be expected to be a 12 Volt DC voltage. However, other voltages such as 24 Volt DC could be used with the present invention 11 as would be done in the standard manner by one skilled in the art. Also shown is an electrical wiring harness 122 along with a toggle switch 124 which toggle switch or other interface would be mounted in the cab of the tractor so it, i.e., the operator interface, could be easily accessed by the operator of the highway tractor. An exemplary toggle switch 124 could be a six prong, two pole toggle switch so that when the operator moved the switch to a first position the shaft 98 would move in a first direction, e.g., open, and when the toggle switch 124 was moved in the opposite direction the shaft 98 would move in the opposite direction, e.g., close. The present invention 11 could be controlled by the operator of the tractor from the cab of the truck.

Turning to FIG. 9, therein is shown a portion of the divergent leg 20 including the opening 60 having a lower and upper edge 21, 23 and showing a cross-sectional view of an exemplary rod member 58 in the opening. The divergent leg 20 could have a height of about 2 to 4 inches and the opening 60 would be disposed about halfway between the top and bottom of the divergent leg 20 to provide maximum strength. The rod member 58 could be round, square or rectangular in shape and have exemplary dimensions of about ½ inch in height and about 2 to 5 inches in width for strength and could vary in length from several inches to a foot or more in length depending on the overall size of the fifth wheel upon which it was installed.

I claim:

1. An improved truck fifth wheel of the type that includes a top plate having a rear opening formed by opposing first and second divergent legs terminating in an elongated medial slot for receiving a king pin of a trailer, a pivotally mounted lock jaw having unlocked and locked positions, the lockjaw having a recess for receiving the king pin therein, a slidable lock bar for securing the lock jaw in the locked position, and a release handle for sliding the lock bar back and forth, wherein the improvement comprises:

a) a rod member mounted on said top plate for reciprocal movement across said slot between a locked, position and an unlocked position to secure said king pin in said slot when said rod member is in said locked position; and b) wherein said rod member has no mechanical interconnection to said release handle.

2. The improvement of claim 1, wherein said rod member reciprocates between first and second opposing through-holes, said first through-hole disposed in a said first divergent leg and said second through-hole disposed in a said second divergent leg.

3. The improvement of claim 2, wherein said rod member is disposed behind said lock bar to permit interference-free operation of said lock bar.

4. The improvement of claim 3, further comprising a linear actuator to reciprocate said rod member.

5. The improvement of claim 3, further comprising a pneumatic cylinder to reciprocate said rod member.

6. A fifth wheel, comprising:

a) a top plate having a rear opening formed by opposing first and second divergent legs terminating in an elongated medial slot for receiving a king pin of a trailer;

b) a pivotally mounted lock jaw having unlocked and locked positions, said lock jaw having a recess for receiving the king pin therein; c) a slidable lock bar for securing said lock jaw in the locked position and a release handle for sliding said lock bar back and forth;

d) a rod member mounted on said top plate for reciprocal movement across said slot between locked and unlocked positions to secure said king pin in said slot when said rod member is in said locked position; and e) wherein, said rod member has no mechanical interconnection to said release handle.

7. The fifth wheel of claim 6, wherein said rod member reciprocates between first and second opposing through-holes, said first through-hole disposed in a said first divergent leg and said second through-hole disposed in a said second divergent leg.

8. The fifth wheel of claim 7, wherein said rod member is disposed behind said lock bar to permit interference-free operation of said lock bar.

9. The fifth wheel of claim 8, further comprising a linear actuator to reciprocate said rod member.

10. The fifth wheel of claim 8, further comprising a pneumatic cylinder to reciprocate said rod member.

11. A method for assembling a fifth wheel, comprising the steps of:

a) providing a top plate having a rear opening formed by opposing first and second divergent legs terminating in an elongated medial slot for receiving a king pin of a trailer;

b) pivotally mounting a lock jaw on said top plate having unlocked and locked positions, said lockjaw having a recess for receiving the king pin therein;

c) providing a slidable lock bar for securing said lock jaw in the locked position and a release handle for sliding said lock bar back and forth;

d) mounting a rod member on said top plate for reciprocal movement across said slot between locked and unlocked positions to secure said king pin in said slot when said rod member is in said locked position; and e) wherein the rod member has no mechanical interconnection to the release handle.

12. The method of claim 11, wherein said rod member reciprocates between first and second opposing throughholes, said first through-hole disposed in a said first divergent leg and said second through-hole disposed in a said second divergent leg.

13. The method of claim 12, wherein said rod member is disposed behind said lock bar to permit interference-free operation of said lock bar.

14. The method of claim 13, further comprising the step of providing a linear actuator to reciprocate said rod member.

15. The method of claim 13, further comprising the step of providing a pneumatic cylinder to reciprocate said rod member.

\* \* \* \* \*